United States Patent [19]

Matsumoto et al.

[11] 4,437,119

[45] Mar. 13, 1984

[54] INTER-FRAME ADAPTIVE PREDICTION SYSTEM FOR TELEVISION SIGNALS

[75] Inventors: Shuichi Matsumoto, Tokyo; Yoshinori Hatori, Kawasaki; Hitomi Murakami, Yokohama; Hideo Yamamoto, Sagamihara, all of Japan

[73] Assignee: Kokusai Denshin Denwa Kabushiki Kaisha, Tokyo, Japan

[21] Appl. No.: 386,575

[22] Filed: Jun. 9, 1982

[30] Foreign Application Priority Data

Jun. 19, 1981 [JP] Japan ................................. 56-94004

[51] Int. Cl.³ ............................................. H04N 7/12
[52] U.S. Cl. ................................................. 358/136
[58] Field of Search ........................ 358/133, 135, 136

[56] References Cited

U.S. PATENT DOCUMENTS

| 3,720,796 | 3/1973 | Cutler | 358/136 |
| 3,761,613 | 9/1973 | Limb | 358/136 |
| 3,767,847 | 10/1973 | Haskell et al. | 358/136 |
| 3,962,535 | 6/1976 | Haskell | 358/136 |
| 4,144,543 | 3/1979 | Koga | 358/136 |

Primary Examiner—Howard W. Britton
Assistant Examiner—Edward L. Coles
Attorney, Agent, or Firm—Robert E. Burns; Emmanuel J. Lobato; Bruce L. Adams

[57] ABSTRACT

An inter-frame adaptive prediction system for television signals is disclosed in which a prediction value $P_1$ for a picture element 1 in the current field is newly produced, through using prediction values $P_{OPT}$ and $P_{MED}$ obtained by the following two procedures.

In a first procedure, the intra-field prediction (a prediction value $X_N$), the inter-field prediction (a prediction value $X_K$) and the inter-frame prediction (a prediction value $X_F$) are performed for a picture element temporally ahead of the picture element in the current field $F_0$, for instance, the picture element 2, and a prediction circuit which yields a prediction value closer to the picture element value $X_2$ of the picture element 2 than the prediction values of any other prediction parts is selected, and a prediction value $X_{1S}$ for the picture element 1 obtainable from the selected prediction circuit is obtained and is used as the prediction value $P_{OPT}$.

In a second procedure, the intra-field prediction, the inter-field prediction and the inter-frame prediction are carried out for the picture element 1, and prediction values obtained from the three prediction circuits are compared in magnitude with one another to obtain a prediction value corresponding to a median, which value is used as the prediction value $P_{MED}$.

Therefore, for a picture signal such that the moving and stationary parts are clearly distinguished in the picture, $P_{OPT}$ obtained by the procedure 1 provides a prediction value close to the true value. On the other hand, for a picture signal such that the moving and stationary parts are not clearly distinguished in the picture, a weighed mean value of the predicted values $P_{OPT}$ and $P_{MED}$ is employed.

1 Claim, 5 Drawing Figures

INTER-FRAME ADAPTIVE PREDICTION SYSTEM FOR TELEVISION SIGNALS

BACKGROUND OF THE INVENTION

The present invention relates to a prediction system which permits high efficiency coding of a picture signal as of commercial television or video telephony through utilization of high correlation between picture elements in a picture.

The existing television is made up of a picture called a frame which is sent at a rate of 30 per second, and each frame consists of two successive fields because of interlaced scanning being carried out every other scanning lines. An element constituting the picture is referred to as a "picture element" but, in this specification, one sample obtained by sampling will be called a picture element in view of digital processing. Accordingly, in this case, the position of each picture element in the picture depends upon the sampling frequency for digitizing a signal.

Therefore, in order to achieve stable coding efficiency by employing mainly the inter-frame prediction coding of the inter-field prediction coding for the still picture and mainly the intra-field prediction coding or the inter-field prediction coding for the moving picture, two representative methods such as described below have been employed in conventional arts.

A first one of them is a system in which a field of a television picture is divided into blocks, each containing n·m picture elements; inter-frame prediction, inter-field prediction and intra-field prediction are effected for each block; prediction values produced by the respective predictions are compared with one another; and that one of prediction circuit which produces the prediction value closest to the true value is utilized as a prediction circuit for a block of an input signal. With this method, it is necessary to transmit to the receiving side over head information indicating the prediction circuit adopted for each block of the input signal, in addition to prediction error information. Accordingly, when to reduce the block size for further fine and adaptive prediction coding, the ratio of the over head information to the transmission rate increases, making it impossible to enhance the coding efficiency.

Another method is a system in which a prediction circuit, which provides a prediction value closest to one pre-coded picture element value, for example, the value of a picture element lying immediately before the current picture element to be coded, is used as a prediction circuit for the current picture element. With this method, since there is no need of transmitting the over head information to the receiving side, fine and adaptive prediction coding is possible; however, the adopted prediction circuit does not always provide the value closest to the current picture element value, and hence high coding efficiency cannot be expected.

SUMMARY OF THE INVENTION

It is one object of the present invention to provide an inter-frame adaptive prediction system for a television signal which performs fine and adaptive prediction of the television signal without transmitting the over head information, thereby to permit coding which enhances the band reduction rate and improves the picture quality.

In accordance with the present invention, there is provided an inter-frame adaptive prediction system for television signals comprising: memory means having a capacity large enough to store an input television signal of at least one frame at all times; intra-field prediction means for generating a prediction value $\overline{X}_{1N}$ of the latest input picture element, through using a picture element value in the same field as the latest input picture element, read out from the memory means when a value $X_1$ of the latest input picture element of the television signal is received; inter-field prediction means for generating a prediction value $\overline{X}_{1K}$ of the latest input picture element, through using picture elements in the same field as the latest input picture element and an immediately preceding field, read out from the memory means when the value $X_1$ of the latest input picture element is received; inter-frame prediction means for generating a prediction value $\overline{X}_{1F}$ of the latest input picture element, through using picture elements in the same field as the latest input picture element, the immediately preceding field and an immediately preceding frame, read out from the memory means when the value $X_1$ of the latest input picture element is applied; median selector means for comparing the prediction values in terms of magnitude to select a prediction value $\overline{X}_{1M}$ assuming a median; previous picture element optimum prediction means for comparing absolute values, $|\overline{X}_{0N}-X_0|$, $|\overline{X}_{0K}-X_0|$ and $|\overline{X}_{0F}-X_0|$, of prediction errors between the prediction values $\overline{X}_{0N}$, $\overline{X}_{0K}$ and $\overline{X}_{0F}$ obtained from the intra-field prediction means, the inter-field prediction means and the inter-frame prediction means for a picture element value $X_0$ immediately before the latest input picture element $X_1$ and the picture element value $X_0$ to select the prediction means providing the smallest value, and for generating a prediction value $\overline{X}_{1S}$ of the latest input picture element value $X_1$ available from the selected prediction means; and prediction generator means for newly generating a prediction value $\overline{X}_1$ of the latest input picture element $X_1$ on the basis of a weighted mean of the prediction value $\overline{X}_{1M}$ obtained from the median selector means and the prediction value $\overline{X}_{1S}$ obtained from the optimum prediction means for the latest picture element value $X_1$.

BRIEF DESCRIPTION OF THE DRAWINGS

The present invention will be described in detail below in comparison with conventional arts with reference to the accompanying drawings, in which.

DETAILED DESCRIPTION

At first, a description will be given of examples of conventional coding systems called an intra-field prediction coding system, an inter-field prediction coding system and an inter-frame prediction coding system.

Figure 1:
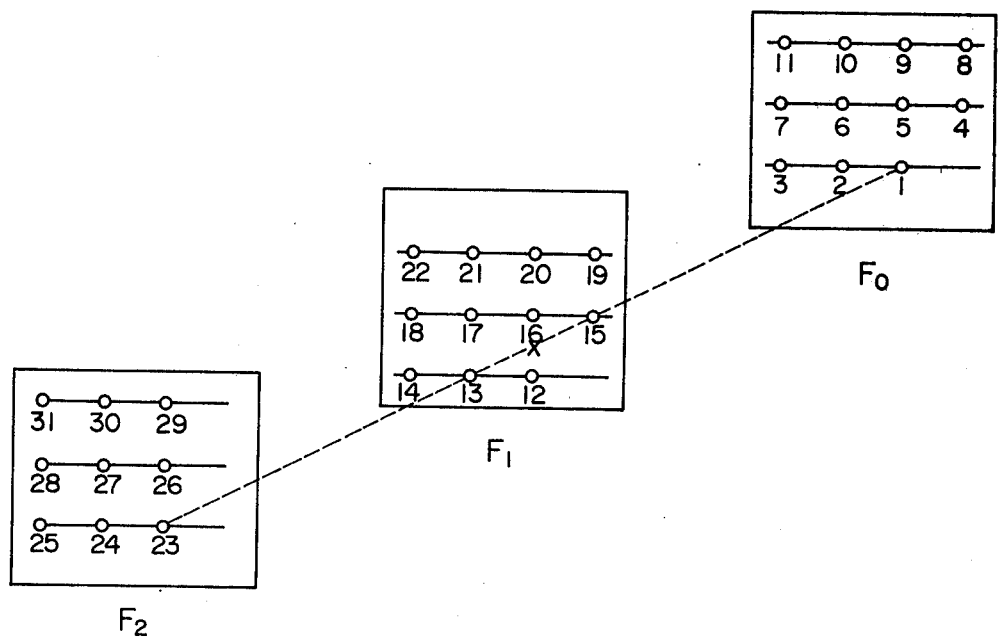
FIG. 1 is a diagram showing the location relations of picture elements explanatory of the principles of the conventional inter-frame prediction coding, inter-field prediction coding, intra-field prediction coding and the present invention.

FIG. 1 shows the location relationship of the picture elements. In this case, since the sampling frequency is selected to be an integer multiple of a horizontal scanning frequency, the picture elements are arranged in the form of grids and, because of the interlaced scanning, lines in a field $F_1$ immediately preceding a current field $F_0$ lie between each of currently-scanned lines of the current field $F_0$ and the lines of a field $F_2$ preceding the immediately previous field $F_1$ occupy the same positions as the lines of the current field $F_0$. At this time, a picture element 2 is next to a current picture element 1 on the left side thereof; picture elements 9 and 10 are just two lines above the picture elements 1 and 2 in the same field; a picture element 5 is just one line above the picture element 1 in the same field; picture elements 12 and 13 are just below the picture elements 1 and 2 in the immediately previous field $F_1$; and picture elements 23 and 26 assume the same positions as the picture elements 1 and 5 in a field $F_2$ of two fields before. In this case, as for picture elements adjoining the abovesaid ones, it is considered that their sample values bear high correlation. Accordingly, in the conventional intra-field prediction coding (see Japanese Patent Application No. 19600/76), a prediction value $\overline{X}_1$ of a sample value $X_1$ of the picture element 1 in FIG. 1 is obtained, through using sample values of the adjoining picture elements, as follows:

$$\overline{X}_1 = \tfrac{3}{4} \cdot X_2 + X_9 - \tfrac{3}{4} \cdot X_{10} \tag{1}$$

and a difference between this prediction value $\overline{X}_1$ and a true value $X_1$, $$Q_x = X_1 - \overline{X}_1 \tag{2}$$

is a prediction error. By quantizing the prediction error for coding, it is possible to effect high efficiency coding so that the required number of transmission bits may be small. This is the intra-field prediction coding system heretofore used. In the above, the prediction value is produced using the values of the picture elements 2, 9 and 10, but it is also possible to adopt such an intra-field coding system which produces the prediction value $\overline{X}_1$ using other picture elements in the same field.

According to the conventional inter-field prediction coding system (see Japanese Patent Application No. 19599/76), the prediction value $\overline{X}_1$ of the picture element 1 is obtained, through using sample values of the picture element 2 and those 12 and 13 just below the picture elements 1 and 2 in the immediately previous field in FIG. 1, as follows:

$$\overline{X}_1 = \tfrac{3}{4} \cdot X_2 + X_{12} - \tfrac{3}{4} \cdot X_{13} \tag{3}$$

and the difference between the prediction value and the true value is quantized in the same manner as in the intra-field prediction coding, thereby performing high efficiency coding. Also in the inter-field prediction coding, it is possible to adopt such an inter-field prediction coding system which employs other picture elements in the previous field $F_1$, as is the case with the intra-field prediction coding.

According to the inter-frame prediction coding, the prediction value $\overline{X}_1$ of the picture element 1 in FIG. 1 is produced, through using the picture element 5 and those 23 and 26 of two fields before assuming the same positions as the picture elements 1 and 5 as follows:

$$\overline{X}_1 = -X_5 + X_{23} + X_{26} \tag{4}$$

and the difference between the prediction value and the true value is quantized in the same manner as in the intra-field prediction coding, thereby to carry out high efficiency coding. Moreover, in the inter-frame prediction coding, such an inter-frame coding system can be effected which uses other picture elements of two fields before, as if the case with the intra-field coding.

With the inter-frame prediction coding, in the case of a still picture, the picture element values $X_1$ and $X_5$ and those $X_{23}$ and $X_{26}$ correspond to the sample values at adjoining positions in the picture, and hence they have high correlation, achieving high coding efficiency. On the other hand, however, in the case of a moving picture, the correlation between the points 1 and 5 and those 23 and 26 lowers in correspondence to their moving distance in the picture as the picture moves in one frame period (1/30 sec), resulting in lowered coding efficiency of the moving picture. With the inter-field prediction coding system, in the case of the still picture, the picture element values $X_1$ and $X_2$ and those $X_{12}$ and $X_{13}$ correspond to sample values at adjoining positions in the picture, and hence they have high correlation, achieving high coding efficiency. In this case, however, since the correlation is not so high as that between the picture element values $X_5$, $X_{23}$, $X_{26}$ and $X_1$ used in the inter-frame prediction coding, the coding efficiency is not so high as in the case of the inter-frame prediction coding. In a case of the moving picture, the points 1 and 2 and those 12 and 13 correspond to the positions in the picture spaced in correspondence to the movement in one field period (1/60 sec). Accordingly, the correlation decreases to result in lowered coding efficiency, but the coding efficiency is not so much lowered as in the case of the inter-frame prediction coding. With the intra-field prediction coding, in the case of the still picture, the coding efficiency cannot be raised so high as in the cases of the inter-field and inter-frame coding. On the other hand, however, in the case of the moving picture, resolution of the picture decreases owing to the integration effect of a television camera and, consequently, the picture element correlation increases by that; therefore, an increase in the coding efficiency can be expected.

The intra-field, inter-field and inter-frame prediction coding have the abovesaid features but, with any one of them, it has been impossible to realize a coding apparatus which exhibits high coding efficiency for either of the still and moving pictures, because the inter-frame coding is low in coding efficiency for the moving picture, because the inter-field coding is insufficient in coding efficiency for the still and moving pictures, and because the intra-field coding is low in coding efficiency for the still picture.

The present invention will hereinafter be described in detail.

In the present invention, a prediction value $P_1$ for the picture element 1 in the current field $F_0$ shown in FIG. 1 is newly produced, through using prediction values $P_{OPT}$ and $P_{MED}$ obtained by the following two procedures.

In a first procedure, the intra-field prediction (a prediction value $X_N$), the inter-field prediction (a prediction value $X_K$) and the inter-frame prediction (a prediction value $X_F$) are performed for a picture element temporally ahead of the picture element 1 in the current field $F_0$, for instance, the picture element 2, and a prediction circuit which yields a prediction value closer to the picture element value $X_2$ of the picture element 2 than the prediction values of any other prediction circuits is selected, and a prediction value $X_{1S}$ for the picture element 1 obtainable from the selected prediction circuit is obtained and is used as the prediction value $P_{OPT}$.

In general, absolute values $|\overline{X}_{0N}-X_0|$, $|\overline{X}_{0K}-X_0|$ and $|\overline{X}_{0K}-X_0|$ of prediction errors between the prediction values $\overline{X}_{0N}$, $\overline{X}_{0K}$ and $\overline{X}_{0F}$ obtainable from the intra-field prediction circuit, the inter-field prediction circuit and the inter-frame prediction circuit for the picture element value $X_0$ immediately preceding the latest input picture element $X_1$ and the aforementioned picture element value $X_0$ are compared in magnitude with one another, and the prediction circuit is selected which provides a minimum value. For instance, if $|\overline{X}_{0N}-X_0|>|\overline{X}_{0K}-X_0|>|\overline{X}_{0F}-X_0|$, the inter-frame prediction circuit is selected. The prediction value $\overline{X}_{1S}$ for the latest picture element value $X_1$ obtained from the thus selected prediction circuit is used as the aforementioned prediction value $P_{OPT}$.

In a second procedure, the intra-field prediction, the inter-field prediction and the inter-frame prediction are carried out for the picture element 1, and prediction values obtained from the three prediction circuits are compared in magnitude with one another to obtain a prediction value corresponding to a median, which value is used as the prediction value $P_{MED}$. For example, if the prediction value $X_K$ corresponds to the median as a result of the comparison of the prediction values $X_N$, $X_K$ and $X_F$ obtained from the respective prediction circuits, the prediction value $P_{MED}$ becomes the inter-field prediction value.

The prediction value $P_1$ shown by Eq. (5) is newly produced through using the prediction values $P_{OPT}$ and $P_{MED}$ obtained as described above, and the prediction value $P_1$ is used as a prediction value for the picture element 1.

$$P_1 = \omega P_{MED} + (1-\omega) P_{OPT} \quad (5)$$

In Eq. (5), $\omega$ indicates a weight coefficient and assumes $0 \leq \omega \leq 1$.

Although in the description of the first procedure the picture element 2 is used as the picture element in the current field $F_0$ temporally preceding the picture element 1, it is also possible to obtain the prediction value $P_{OPT}$ for other picture elements in the same field as the picture element, for instance, 3 and 4. Furthermore, the prediction value $P_{OPT}$ can be obtained using a plurality of picture elements. For instance, in the case of using three picture elements 2, 3 and 4, their prediction values $P_{OPT}$ for the picture element 1 are represented by $P_{OPT}^{(2)}$, $P_{OPT}^{(3)}$ and $P_{OPT}^{(4)}$ and, by obtaining a mean value of them as shown by Eq. (6), the prediction value $P_{OPT}$ can be obtained.

$$P_{OPT} = \tfrac{1}{3}(P_{OPT}^{(2)} + P_{OPT}^{(3)} + P_{OPT}^{(4)}) \quad (6)$$

By substituting the prediction value obtained by Eq. (6) in Eq. (5), the prediction value $P_1$ for the picture element 1 can be produced.

Generally, in a television signal, some correlation exists between optimum prediction functions (which provide a prediction value closest to a true picture element) of adjacent picture elements in the same field. For instance, in the case of a picture element of a moving part in the picture, the rate of the intra-field prediction circuit being selected is high and, in the case of a picture element of a still part of the picture, the rate of the inter-frame prediction circuit being selected is high. Accordingly, for a picture signal such that the moving and stationary parts are clearly distinguished in the picture, $P_{OPT}$ obtained by the procedure 1 provides a prediction value close to the true value. On the other hand, for a picture signal such that the moving and stationary parts are not clearly distinguished in the picture, $P_{OPT}$ is not preferred as a prediction value.

On the other hand, the prediction value $P_{MED}$ selected by the median is compared with the other two unselected values, and the absolute value of a prediction error between it and the true value does not become maximum at all times but it becomes minimum or intermediate. This prediction value does not depend on the amount of features such as the movement of the picture and its picture pattern. Accordingly, it can be considered that the weighted mean value of these prediction values is a combination of a prediction value obtained dependent upon the amount of the features and a prediction value capable of achieving a certain prediction efficiency independently of the amount of features. With these prediction values, a high prediction efficiency can be achieved.

Figure 2:
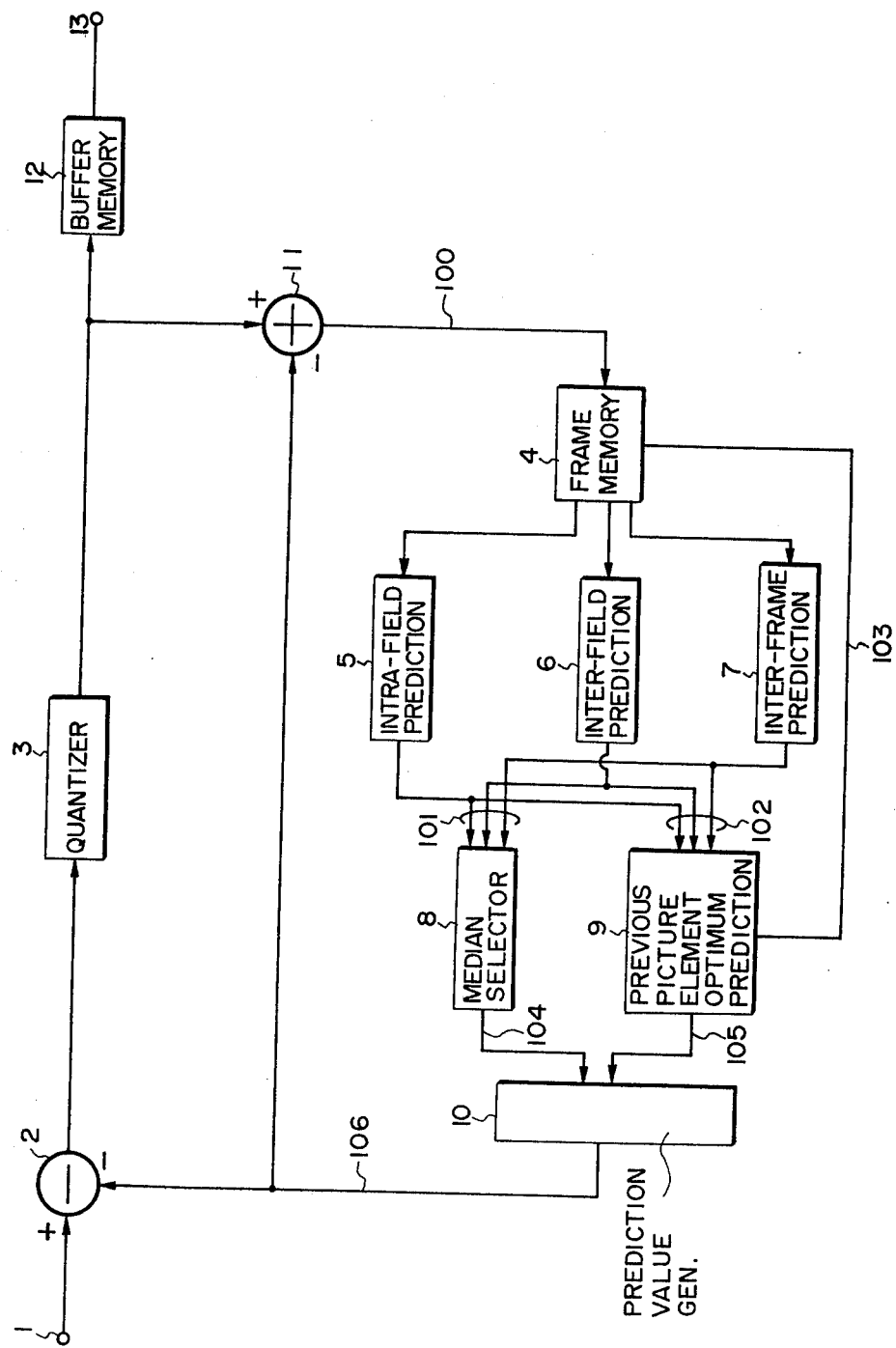
FIG. 2 is a block diagram illustrating an embodiment of the present invention.

FIG. 2 illustrates an embodiment of the present invention. Reference numeral 1 indicates a signal input terminal; 2 designates a subtractor; 3 identifies a quantizer; 4 denotes a frame memory; 5 represents a intra-field prediction circuit; 6 shows a inter-field prediction circuit; 7 refers to an inter-frame prediction circuit; 8 signifies a median selector; 9 indicates a previous picture element optimum prediction circuit; 10 designates a prediction value generating circuit; 11 identifies an adder; 12 denotes a buffer memory; and 13 represents a signal output terminal.

A digitized television signal is applied to the signal input terminal 1. The intra-field prediction circuit 5, the inter-field prediction circuit 6 and the inter-frame prediction circuit 6 respectively produce prediction values for the latest picture element value just applied on the basis of picture element values of the current field $F_0$, an immediately previous field $F_1$ and a field $F_2$ preceding it, stored in the frame memory 4. The median selector 8 compares the prediction values of the intra-field, inter-field and inter-frame predictions in terms of magnitude, and selects a prediction value corresponding to a median. On the other hand, in the previous picture element optimum prediction circuit 9, absolute values of prediction errors between a picture element in the current field $F_0$ stored in the frame memory 4, for instance, a picture element value immediately preceding the picture element applied from the signal input terminal 1 and the prediction values of the intra-field, inter-field and inter-frame predictions, and the prediction circuit which provides the smallest value is selected, and a prediction value of the applied picture element value. In the prediction value generating circuit 10, weighted mean of the two prediction values obtained from the median selector 8 and the previous picture element optimum prediction circuit 9 is obtained to newly generate one prediction value, which is subtracted from the picture element value applied from the input signal terminal 1, and the subtracted result is quantized by the quantizer 3. The quantized output is locally decoded by the addition operation in the adder 11 with the prediction value from the prediction value generating circuit 10, and it is stored in the frame memory 4. At the same time, it is applied via the buffer memory 12 to the signal output terminal 13 and is coded by an encoder not shown into a desired coded form.

Figure 3:
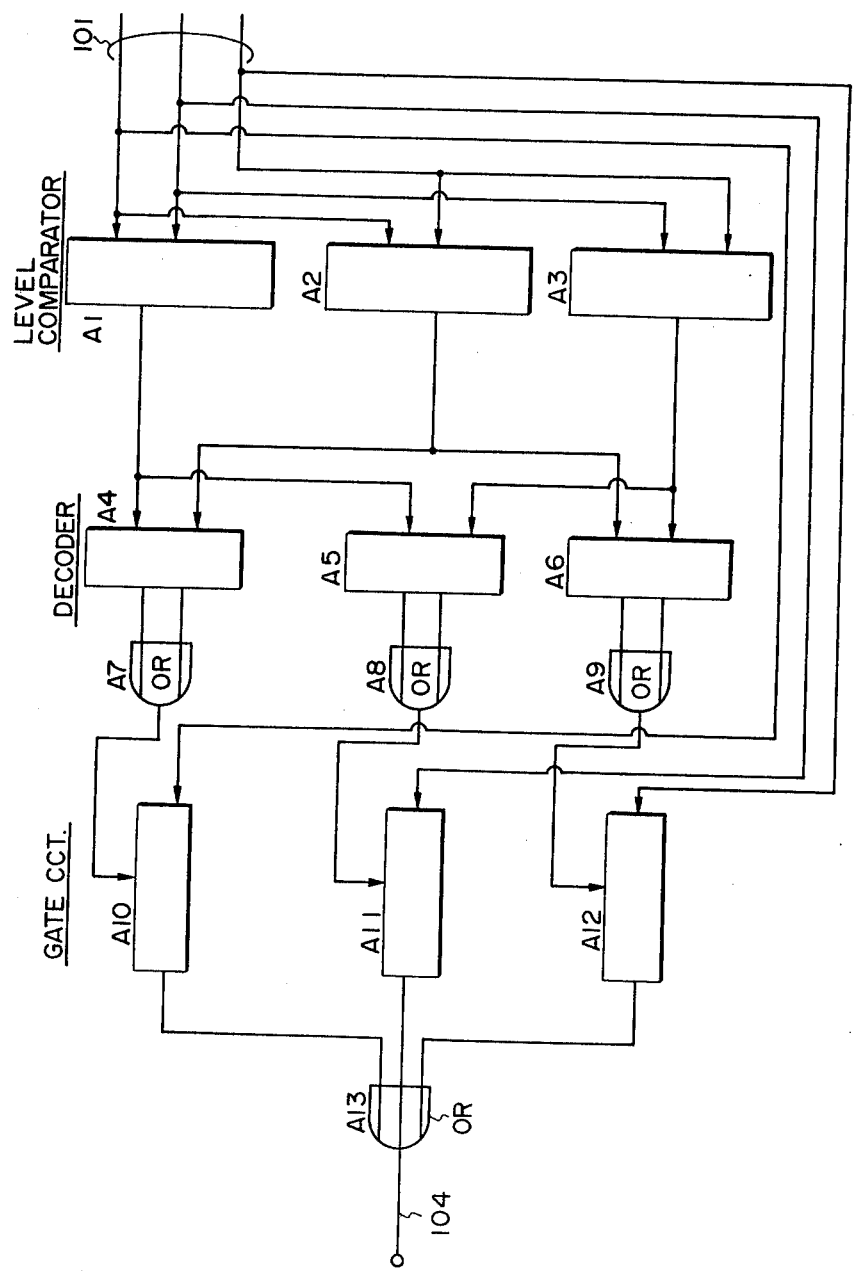
FIG. 3 is a block diagram showing an example of the arrangement of the median selector used in the embodiment of FIG. 2.

FIG. 3 shows a specific example of the median selector 8 used in FIG. 2. Reference characters A1, A2 and A3 indicate level comparators; A4, A5 and A6 designate decoders; A7, A8, A9 and A13 identify OR circuits; A10, A11 and A12 denote gate circuits; and 101 and 104 represent the same leads as in FIG. 2.

The three prediction values sent from the intra-field prediction circuit 5, the inter-field prediction circuit 6 and the inter-frame prediction circuit 7 are applied to the level comparators A1, A2 and A3 and the gate circuits A10, A11 and A12. In the level comparators A1, A2 and A3, the prediction values are compared in magnitude, and information of the prediction value corresponding to the median is provided via the decoders A4, A5 and A6 and the OR circuits A7, A8 and A9 to the gate circuits A10, A11 and A12, and the prediction value corresponding to the median is obtained by the OR circuit A13.

Figure 4:
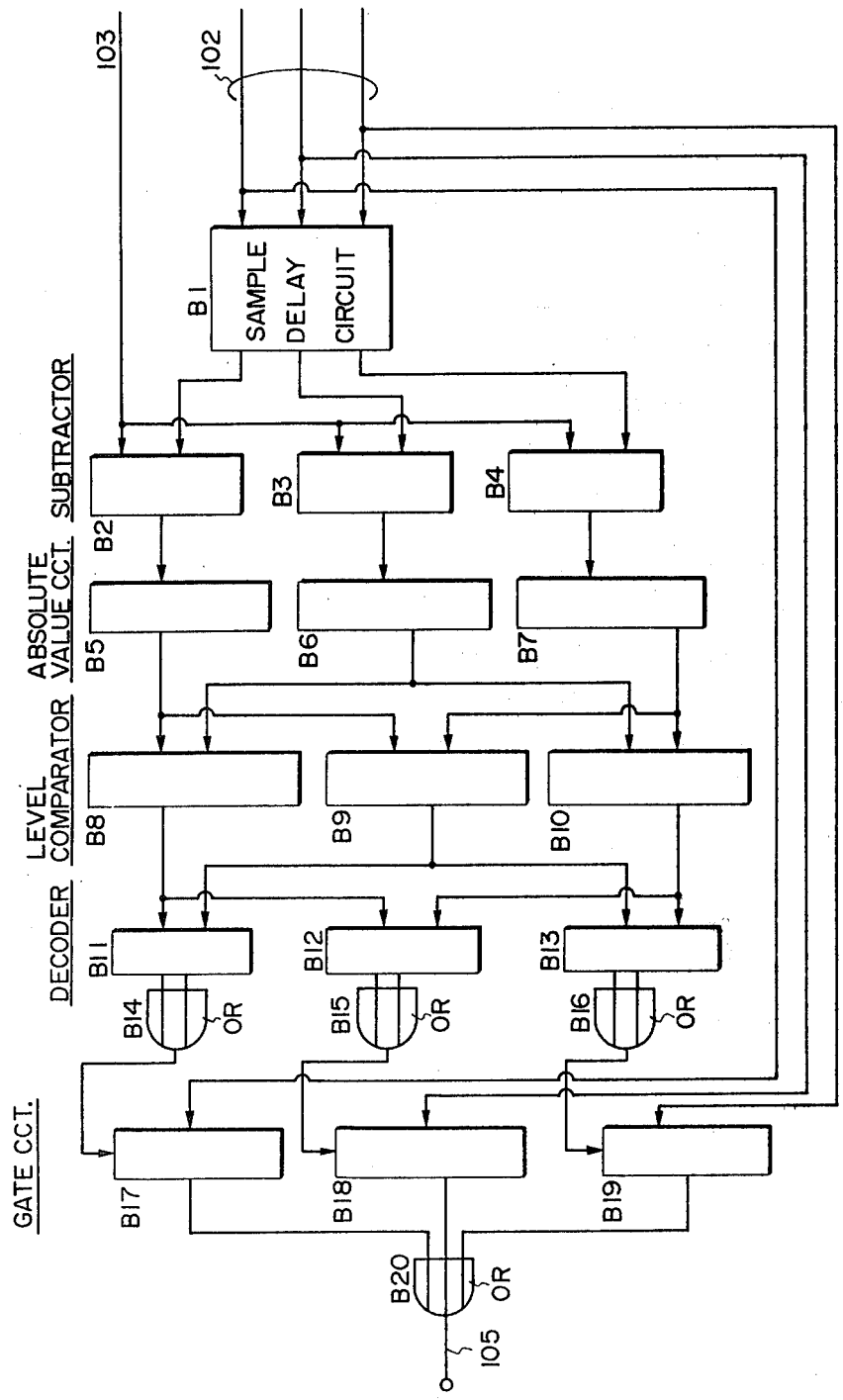
FIG. 4 is a block diagram showing an example of the arrangement of the previous picture element optimum prediction circuit used in the embodiment of FIG. 2.

FIG. 4 shows a specific example of the previous picture element optimum prediction circuit 9 employed in FIG. 2. Reference character B1 indicates a sample delay circuit; B2, B3 and B4 designate subtractors; B5, B6 and B7 identify absolute value circuits; B8, B9 and B10 denote level comparators; B11, B12 and B13 represent decoders; B14, B15, B16 and B20 show OR circuits; B17, B18 and B19 refer to gate circuits; and 102, 103 and 105 indicate the same leads as in FIG. 2.

Figure 5:
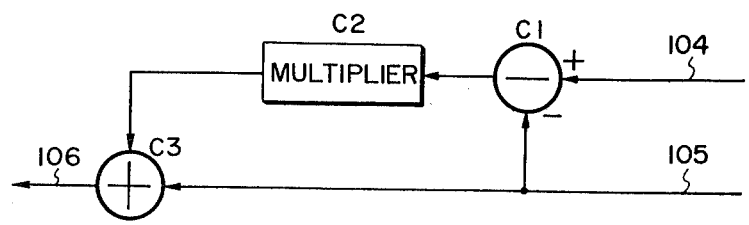
FIG. 5 is a block diagram showing an example of the arrangement of the prediction value generator employed in the embodiment of FIG. 2.

The three prediction values set from the intra-field prediction circuit 5, the inter-field prediction circuit 6 and the inter-frame prediction circuit 7 are provided to the delay circuit B1 and the gate circuits B17, B18 and B19. In the delay circuit B1, the prediction values are delayed for one or several samples so as to generate a prediction value corresponding to a picture element in the current field $F_0$ sent from the frame memory 4, for example, a picture element value immediately preceding the picture element applied from the signal input terminal 1. In the subtractors B2, B3 and B4 and the absolute value circuits B5, B6 and B7, the absolute values of prediction errors between the picture element value in the current field $F_0$ and the prediction value from the delay circuit B1 are computed and the computed results are provided to the level comparators B8, B9 and B10. In the comparators, the absolute values of the prediction errors are compared with one another, and information of the prediction circuit which provides the minimum value is applied via the decoders B11, B12 and B13 and the OR circuits B14, B15 and B16 to the gate circuits B17, B18 and B19, wherein prediction values for the picture element 1 applied from the signal input terminal 1 are obtained. FIG. 5 shows a specific example of the prediction value generator 10. Reference character C1 indicates a subtractor; C2 designates a multiplier; C3 identifies an adder; and 104, 105 and 106 denote the same leads as in FIG. 2.

The information of the prediction value sent from the median selector 8 and the previous picture element optimum prediction circuit 9 is subtracted by the subtractor C1 and is multiplied by $\omega$ in the multiplier C2. The multiplied output is applied to the adder C3 wherein it is added to the information of the prediction value from the previous picture element optimum prediction circuit 9 to obtain weighted mean.

As has been described in the foregoing, the present invention permits coding of high prediction efficiency and excellent picture quality by performing an adaptive prediction through utilization of the magnitude relation of prediction values and the prediction error information between adjacent picture elements; hence the present invention is applicable to the television signal coding system of high quality and high reduction.

What we claim is:

1. An inter-frame adaptive prediction system for television signals comprising: input terminal means for receiving an input television signal; memory means having a capacity large enough to store the input television signal of at least one frame at all times; intra-field prediction means for generating a prediction value $\overline{X}_{1N}$ of the latest input picture element, through using a picture element value in the same field as the latest input picture element, read out from the memory means when a value $X_1$ of the latest input picture element of the television signal is received; inter-field prediction means for generating a prediction value $\overline{X}_{1K}$ of the latest input picture element, through using picture elements in the same field as the latest input picture element and an immediately preceding field, read out from the memory means when the value $X_1$ of the latest input picture element is received; inter-frame prediction means for generating a prediction value $\overline{X}_{1F}$ of the latest input picture element, through using picture elements in the same field as the latest input picture element, the immediately preceding field and an immediately preceding frame, read out from the memory means when the value $X_1$ of the latest input picture element is received; median selector means for comparing the prediction values in terms of magnitude to select a prediction value $\overline{X}_{1M}$ assuming a median; previous picture element optimum prediction means for comparing absolute values, $|\overline{X}_{0N}-X_0|$, $|\overline{X}_{0K}-X_0|$ and $|\overline{X}_{0F}-X_0|$, of prediction errors between the prediction values $\overline{X}_{0N}$, $\overline{X}_{0K}$ and $\overline{X}_{0F}$ obtained from the intra-field prediction means, the inter-field prediction means and the inter-frame prediction means for a picture element value $X_0$ immediately before the latest input picture element $X_1$ and the picture element value $X_0$ to select the prediction means providing the smallest value, and for generating a prediction value $\overline{X}_{1S}$ of the latest input picture element value $X_1$ available from the selected prediction means; and prediction generator means for newly generating a prediction value $X_1$ of the latest input picture element $X_1$ on the basis of a weighted mean of the prediction value $\overline{X}_{1M}$ obtained from the median selector means and the prediction value $\overline{X}_{1S}$ obtained from the optimum prediction means for the latest picture element value $X_1$.

* * * * *